US009548897B2

(12) United States Patent
Adogla

(10) Patent No.: US 9,548,897 B2
(45) Date of Patent: Jan. 17, 2017

(54) NETWORK ENTITY REGISTRY FOR NETWORK ENTITY HANDLES INCLUDED IN NETWORK TRAFFIC POLICIES ENFORCED FOR A PROVIDER NETWORK

(71) Applicant: Amazon Technologies, Inc., Reno, NV (US)

(72) Inventor: Eden Grail Adogla, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 72 days.

(21) Appl. No.: 14/158,504

(22) Filed: Jan. 17, 2014

(65) Prior Publication Data

US 2015/0207683 A1   Jul. 23, 2015

(51) Int. Cl.
*H04L 12/24* (2006.01)

(52) U.S. Cl.
CPC ....... *H04L 41/0893* (2013.01); *H04L 41/5022* (2013.01); *H04L 41/5029* (2013.01)

(58) Field of Classification Search
CPC ......... H04L 47/41; H04L 41/08; H04L 47/125
See application file for complete search history.

(56) References Cited

U.S. PATENT DOCUMENTS

| 7,480,798 | B2 | 1/2009 | Haugh |
| 7,567,510 | B2 | 7/2009 | Gai et al. |
| 7,827,402 | B2 | 11/2010 | Smith |
| 8,356,346 | B2 | 1/2013 | Datta et al. |
| 8,401,006 | B2 | 3/2013 | Johnson et al. |
| 2003/0004950 | A1 | 1/2003 | Wils et al. |
| 2004/0022258 | A1* | 2/2004 | Tsukada et al. ............. 370/401 |
| 2004/0215824 | A1 | 10/2004 | Payrits ............. H04L 29/12103 709/245 |
| 2006/0233180 | A1* | 10/2006 | Serghi et al. ............... 370/401 |
| 2009/0138577 | A1* | 5/2009 | Casado et al. .............. 709/220 |
| 2010/0043066 | A1* | 2/2010 | Miliefsky ........................ 726/9 |
| 2013/0332982 | A1* | 12/2013 | Rao et al. ........................ 726/1 |
| 2014/0126418 | A1* | 5/2014 | Brendel et al. .............. 370/254 |

OTHER PUBLICATIONS

International Search Report and Written Opinion from PCT/US15/11525, Dated Apr. 20, 2015, Amazon Technologies, Inc., pp. 1-17.

* cited by examiner

*Primary Examiner* — Nicholas Taylor
*Assistant Examiner* — Sanjoy Roy
(74) *Attorney, Agent, or Firm* — Robert C. Kowert; Meyertons, Hood, Kivlin, Kowert & Goetzel, P.C.

(57) ABSTRACT

A provider network may implement network entity registry for network entity handles included in network traffic policies enforced for a provider network. Network entity entries may be maintained in a network entity registry that specify network address information for network entity handles included in network traffic control policies. Network traffic control policies may be enforced by a network traffic controller. When an update to an network entity entry is received, the network entity entry may be updated and network address information specified in the network entity entry may be provided to a subset of network traffic controls implemented in a provider network for those network traffic controls enforcing network traffic policies including the network entity handle for the updated network entity entry. Network entity entries may, in some embodiments, not be updated by a network entity entry owner.

20 Claims, 12 Drawing Sheets

NETWORK ENTITY REGISTRY FOR
NETWORK ENTITY HANDLES INCLUDED
IN NETWORK TRAFFIC POLICIES
ENFORCED FOR A PROVIDER NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies may be leveraged to create many different types of services or perform different functions for client systems or devices. For example, virtual machines may be used to implement a network-based service for external customers, such as an e-commerce platform. Virtual machines may also be used to implement a service or tool for internal customers, such as information technology (IT) service implemented as part of an internal network for a corporation. Network traffic may therefore be directed to these virtual machines in order to perform the various functions or tasks provided by the services or functions performed utilizing the virtual machines. In order to ensure that authorized or controlled access is enforced against network traffic received at virtual machines, network traffic policies may be employed that control the network traffic both to and from virtual machines. As the network environment in which virtual machines operate may change, network traffic policies may change correspondingly. However, managing traffic policies for a diverse set of virtual machines, the numbers of which may be scaled up or down on, may prove burdensome when implementing multiple changes to network traffic policies.

Figure 1:
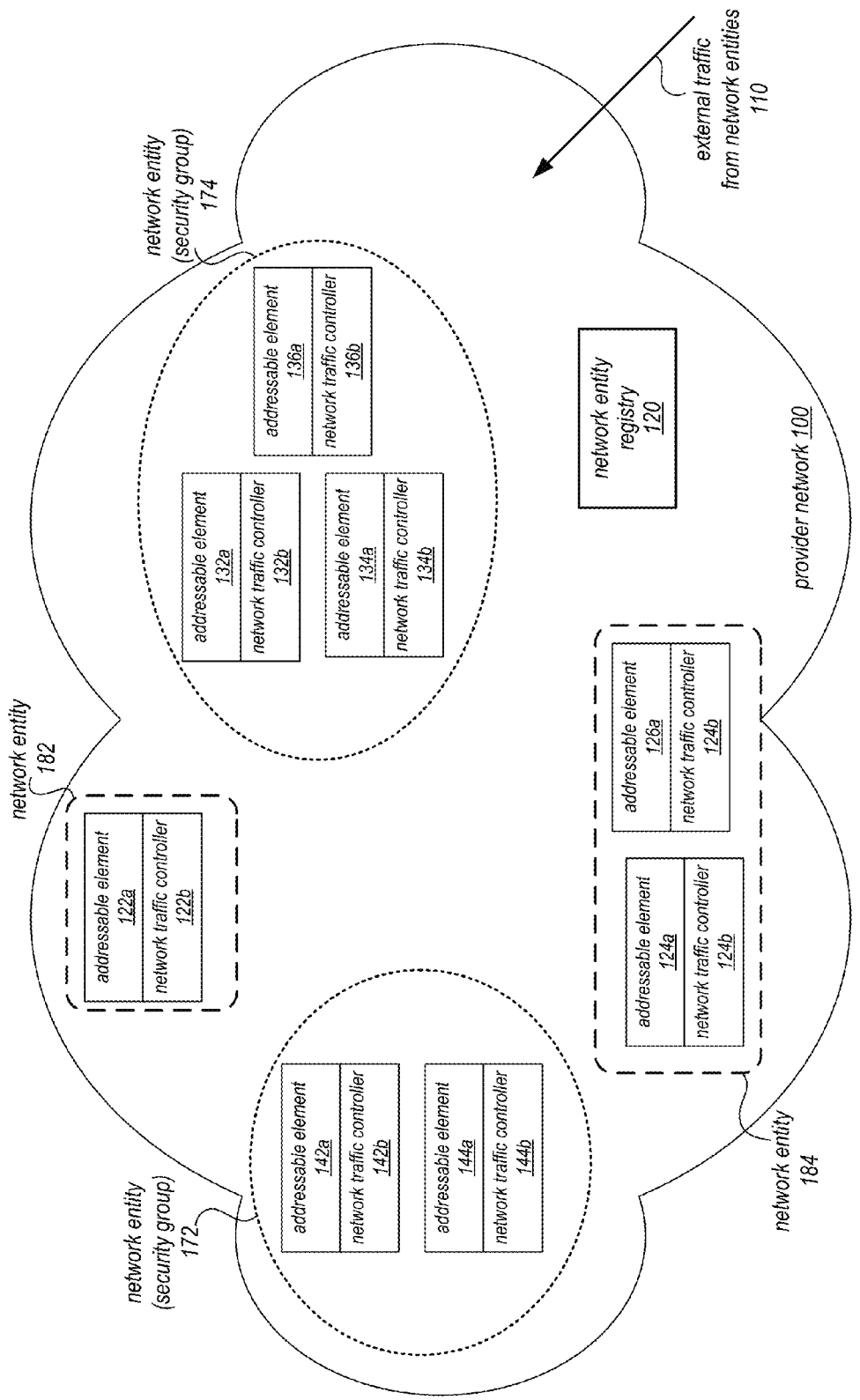
FIG. 1 is a diagram illustrating a network entity registry and multiple network entities in a network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a network entity registry for network entity handles included in network traffic policies enforced for a provider network, according to some embodiments. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Clients of the provider network may reserve (i.e., purchase or buy) one or more compute resources (such as compute instances) to perform various functions, services, techniques, and/or applications. As part of performing these functions, services, techniques, and/or applications, network traffic may be allowed, prohibited, or otherwise managed at different compute resources. For example, a set of compute resources, such as multiple servers providing an authentication service for an e-commerce website, may only accept network traffic from a set of particular internet protocol (IP) addresses. Such a restriction, allowance, prohibition, or other network traffic control may be described in a network traffic policy (e.g., "ALLOW traffic on Port X from IP address Y"). Provider clients may configure network traffic policies to be enforced the same for multiple compute resources, forming a security group for the multiple compute resources. Security groups may apply multiple network traffic control policies which may in turn have one or more network flow control policies.

Provider clients who utilize computing resources may take advantage of the flexibility with which new resources can be acquired. Virtual compute resources, for example, can be quickly scaled to meet demand, such as for a provider client implementing a fast-growing web service. As the number of compute instances grows, managing different security policies and security groups can become complex and time consuming. For example, compute instances may belong to multiple different security groups, each of which may enforce multiple different network traffic policies. Manually updating each security group for each change to a network traffic policy may prove costly to provider clients and may not allow for changes in network traffic policy to react quickly to changing network traffic conditions.

FIG. 1 is a diagram illustrating a network entity registry and multiple network entities in a network, according to some embodiments. Network traffic policies, and their related security groups, may be updated without manually changing every affected group or policy, in some embodiments. For example, a network traffic policy may include a network entity handle to a network entity entry maintained in a network entity registry. As illustrated in FIG. 1, provider network 100 may implement network entity registry 120 to maintain entries for different network entities both within provider network 100 and external of provider network 100, in various embodiments. Network entities may generally be one or more different computing systems or devices that may send data to or receive data from (i.e. network traffic) other computing systems or devices. Network entities may be identified, but are not limited to, as single IP addresses, such as may identify particular hosts, ranges of IP addresses, such as may identify a subnet of a network (may include an IP address and a mask), domain or host names, such as may be translated into different IP addresses, endpoints for various network mechanisms, such as a virtual private network (VPN), groups of different entities, such as defined by a security group, or any other information used in locating a particular entity. In various embodiments, network entities may appear to be arbitrary, or otherwise unrelated addressable elements. Entries for network entities may be maintained in network entity registry 120, and include network address or location information for the entity and a handle name or identifier, in some embodiments. Other information may also be maintained, in some embodiments, for a network entity entry such as a version number and/or one or more prior versions of various portions of the network entry (e.g., network address information). A deployment schedule for the network entity entry (e.g., when and/or how is the network address information to be provided) may be maintained. In some embodiments, network entity registry 120 may also maintain information describing network traffic controllers or other systems, components, or devices that enforce network traffic policies that include a handle to a particular network entity entry.

For example, network entity 182 may be a single system (or endpoint for a system or network of computing devices). For example, network entity registry may maintain an entry for network entity 182, specifying network address information for network entity 182, such as the IP address for addressable element 122a. Network traffic controller 122b may be configured to provide access to and from network addressable element 122a over provider network 100. In another example, network entity 184 may include multiple addressable elements 124a and 126a (along with their respective network traffic controllers 124b and 126b). Network address information for network entity 184 may include a range of IP addresses, or identify network entity 184 as a subnet. Entries may also be maintained for network entities that are groups of addressable elements, which may or may not be members of the same subnet (as may be for network entity 184). For example, network entity 174 may be a security group that includes multiple addressable elements, 132a, 134a, and 136a (as well as their respective network traffic controllers 132b, 134b, and 136b) which may be associated together to enforce common network traffic policies. Addressable element 132a may be an endpoint to a network of other computing systems or devices, while addressable elements 134a and 136a may be addressable elements to single computing systems. Network entities may contain varying numbers and/or sizes. Network entity 172, for example, is a security group with 1 less addressable element (addressable elements 142a and 144a as well as their respective network traffic controllers 142b and 144b) than network entity 174. Network entities external to provider network 100 may also have corresponding entries in network entity registry 120, as network traffic 110 from external entities may be directed toward various resources within provider network 100.

In various embodiments, network entity registry 120 may be implemented as part of service for managing network traffic policies for a provider network. For example, a network entity registry may be implemented as part of a security group management service which may manage or coordinate network traffic policies for security groups established for resources of a provider network. A security group management service may communicate with other services, such as a mapping service or other routing component or service, to provide specified network address information for network entity entries to other systems enforce network traffic control policies. Although illustrated adjacent to addressable elements, network traffic controllers may be located, in some embodiments, on separate systems or devices through which network traffic to an addressable elements flows.

Figure 2:
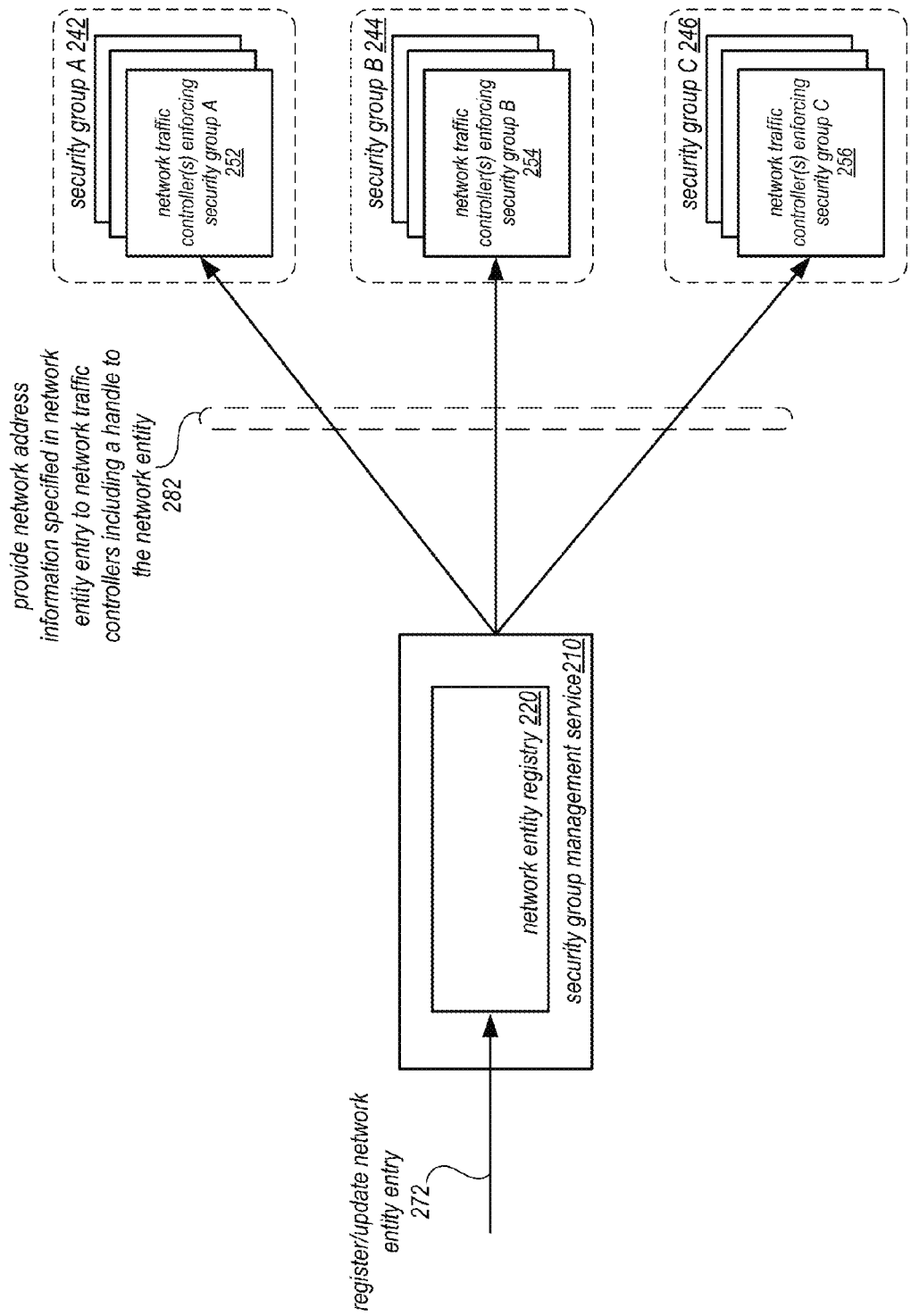
FIG. 2 is a data flow diagram illustrating updates to network entity entries in a network entity registry, according to some embodiments.

FIG. 2 is a data flow diagram illustrating the creation of and/or updates to network entity entries in a network entity registry, according to some embodiments. New network entities are registered and/or updates to network entity entries 272 are received at network entity registry 220 (illustrated as implemented as part of security group management service 210). Changes corresponding to the update are made in the respective entries of network entity registry 220 or new entity entries are created. Various different structured data stores, such as databases or other storage schemes, may be used to store the network entity entries. In some embodiments, authentication and authorization credentials and/or procedures may be satisfied prior to allowing registration of new network entities or updates to network entity entries.

For updated network entity entries (or new network entity entries), network address information specified in the network entity entry may be provided to network traffic controllers enforcing network traffic control policies that include a handle to (e.g., include a handle id or other handle reference) to the network entity entry 282. Network address information may be provided to network traffic controllers in different ways. For example, in some embodiments, a push technique may be implemented, sending network address information for network entity entries to network traffic controllers when the update or new entry is received or maintained. For example, security group management service 210 may maintain information regarding network traffic policies associated with particular security groups, as well as the membership of particular security groups. Thus, network traffic controllers 252 for security group A 242 may described, listed, or indexed in security group management service 210, and the network address information for network entity entries may be sent to network traffic controllers 252 identified based on this membership information. Similarly, for security group B 244 and security group C, 246, membership information may be maintained that allows security group management service 210 to identify network traffic controllers 254 enforcing security group B and network traffic controllers 256 enforcing security group C. Alternatively, in some embodiments, network traffic controllers 252, 254, and 256 may request (e.g., using a polling behavior) network address information for new or updated network entity entries for respective network entity handles. Please note, that in various embodiments, network traffic controllers 252, 254, and 256 may be a subset of a larger number of network traffic controllers enforcing network traffic policies in a provider network. For example, those network traffic controllers enforcing network traffic policies that do not include a network entity handle for a new or updated network entity entry may not receive network address information 282, in various embodiments.

Figure 3:
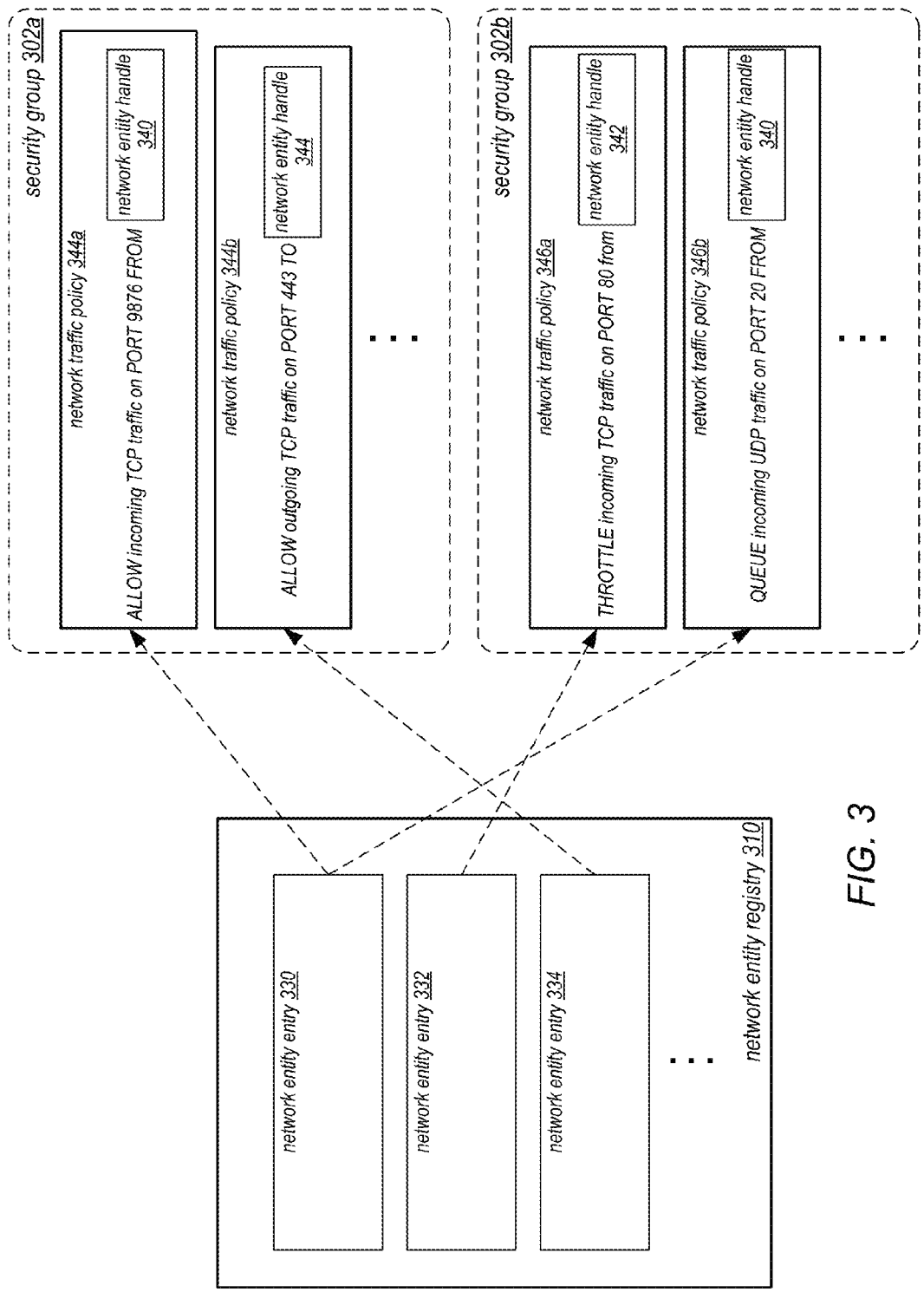
FIG. 3 is a block diagram illustrating examples of network entity entries, network traffic policies including network entity handles, and security groups, according to some embodiments.

As discussed above, network traffic policies may include network entity handles to network entity entries maintained in a network entity registry. FIG. 3 is a block diagram illustrating examples of network entity entries, network traffic policies including network entity handles, and security groups, according to some embodiments. Network entity registry 310 maintains multiple network entity entries, such as entries 330, 332, and 334. Each network entity entry may include network address information for a network entity, such as an IP address, range of IP addresses, masks, and various other forms of network address information to identify and/or communicate with a network entity. Network entity entries may also include a handle, such as handle reference or identifier, which may be included in network traffic policies to indicate the network entity entry which specifies network address information for the network traffic policy. In some embodiments, a version identifier may be maintained that identifies a particular version of the network entity entry (e.g., a version number or a timestamp). In some embodiments, multiple prior versions of entity entries may be maintained in addition to a current entity entry, which may be provided to network traffic controllers to roll back changes, for instance.

Network traffic policies may implement many different types of network traffic control. For example, some network traffic policies may be configured to allow or prohibit traffic. Network traffic policy 344a allows incoming TCP traffic on port 9876 from network entity handle 340. While network traffic policy 344b allows outgoing TCP traffic on port 443 to network entity handle 344. Network traffic policies may also be used to enforce network flow controls, such as throttling traffic, as illustrated in network traffic policy 346a, handling traffic in a particular order or storing traffic in a particular way, such as in network traffic policy, 346b. In some embodiment, network bandwidth adjustments may be made using network traffic policies that include network entity handles. Various different types of attributes or information may be included in network traffic policies, such as particular protocols, ports, and/or types of traffic. As noted above in FIG. 1, network entities may include multiple systems or devices, as well as subnets, endpoints for VPNs, gateways, or other security mechanisms, as well as groups, such as security groups of multiple network entities. Network traffic policies may, therefore, be configured in many different ways as to control traffic from these entities, and thus the previous examples of network traffic policies are not intended to be limiting.

Network entity handles may be expanded with specified network address information in the particular network entity entry which the network entity handle references. If, for example, network entity handle 340 has a handle reference of "bob_network" then network entity entry 330 which includes the handle "bob_network" may specify the network address information to expand handle 340 for enforcing network traffic policies 344a and 346b. Similarly, network entity handle may have an id, such as entity 2ABY1 which is also included in network entity entry 344.

In some embodiments, network traffic policies may be associated with particular security groups, enforced for all computing resources that are members or associated with a particular security group. Network traffic policies 344a and 344b, for instance, are both enforced for computing resources that are members of security group 302a. Similarly, network traffic policies 346a, and 346b, are both enforced for computing resources that are members or associated with security group 302b. Computing resources may, in some embodiments, be associated with multiple security groups. Therefore, a particular computing resource, such as a particular compute instance, may be a member of security group 302a and 302b.

Please note that previous descriptions are not intended to be limiting, but are merely provided as an example of provider networks, network entity registries, and network traffic policies. Various other components may interact with or assist in enforcing network traffic policies including handles for network entity entries.

This specification next includes a general description virtual computing resource provider, which may implement a network entity registry for network entity handles included in network traffic policies enforced for a provider network. Then various examples of a virtual computing resource provider are discussed, including different components/modules, or arrangements of components/module that may be employed as part of implementing a virtual computing resource provider. A number of different methods and techniques to implement a network entity registry for network entity handles included in network traffic policies enforced for a provider network are then discussed, some of which are illustrated in accompanying flowcharts. Finally, a description of an example computing system upon which the various components, modules, systems, devices, and/or nodes may be implemented is provided. Various examples are provided throughout the specification.

Figure 4:
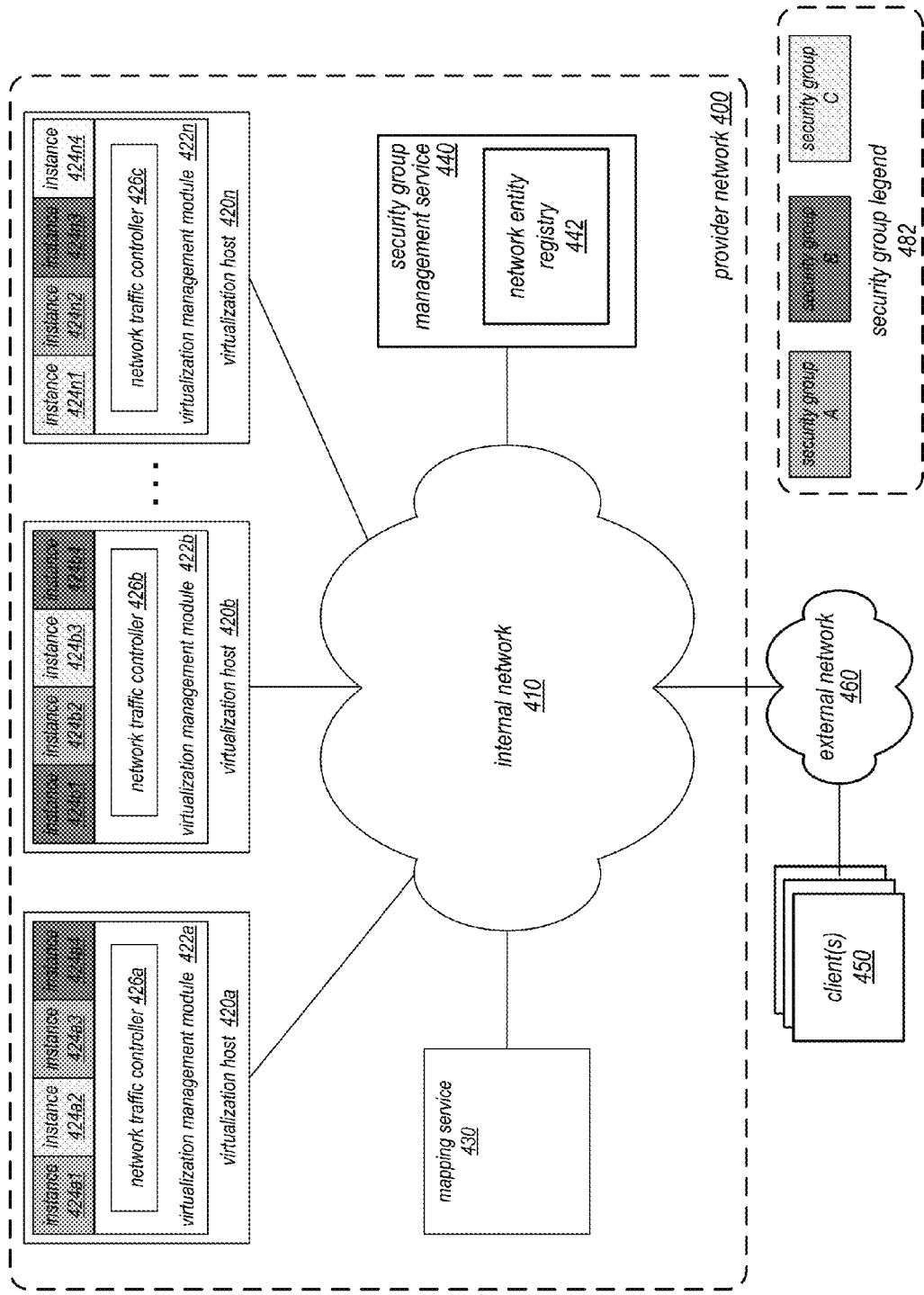
FIG. 4 is a block diagram illustrating a virtual computing resource provider that implements a network entity registry for network entity handles included in network traffic policies enforced at network traffic controllers, according to some embodiments.

FIG. 4 is a block diagram illustrating a virtual computing resource provider that implements a network entity registry for network entity handles included in network traffic policies enforced at network traffic controllers, according to some embodiments. Provider network 400 may be set up by an entity such as a company or a public sector organization to provide one or more services (such as various types of cloud-based computing or storage) accessible via the Internet and/or other networks to clients 450. Provider network 400 may include numerous data centers hosting various resource pools, such as collections of physical and/or virtualized computer servers, storage devices, networking equipment and the like, needed to implement and distribute the infrastructure and services offered by the provider network 400. In some embodiments, provider network 300 may provide computing resources. These computing resources may in some embodiments be offered to clients in units called "instances," 424 such as virtual or physical compute instances or storage instances.

A virtual compute instance 424 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 424 of provider network 400 in different embodiments, including general purpose or special purpose computer servers, storage devices, network devices and the like. In some embodiments instance clients 450 or other any other user may be configured (and/or authorized) to direct network traffic to a compute instance 424.

Compute instances 424 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 450 applications, without for example requiring the client 450 to access an instance 424. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length.

In various embodiments, compute instances may be associated with one or more different security groups. As noted above security groups may enforce one or more network traffic policies for network traffic at members of the security group. Membership in a security group may not be related to physical location or implementation of a compute instance. Security group legend 482 illustrates the various different shadings used to denote membership in a security group. For example, compute instances 424a1, 424a2, 424a3, and 424a4 implemented on the same virtualization host 420a may belong to different security groups A, B, and C. Other group members, such as instance 424b1, 424b4, and 424n3 for security group B are implemented at different physical locations. Similarly, instances 424a1, 424a3, 424b2, and 424n2 for security group A and instances 424a2, 424b3, 424c1, and 424n4 for security group C are also located differently. The number of members or associations with a particular security group may vary, and this previous discussion and illustration is not intended to be limiting as to the number of group members in a particular security group. Each security group A, B, and C may enforce respective network traffic policies for their member instances. In some embodiments, one or more network traffic policies in each security group may include the same network entity handle (as discussed above with regard to FIG. 2). The previous descriptions are not intended to be limiting, but merely illustrative of the many different configurations possible for a compute instances 424 provided by provider network 400.

Figure 12:
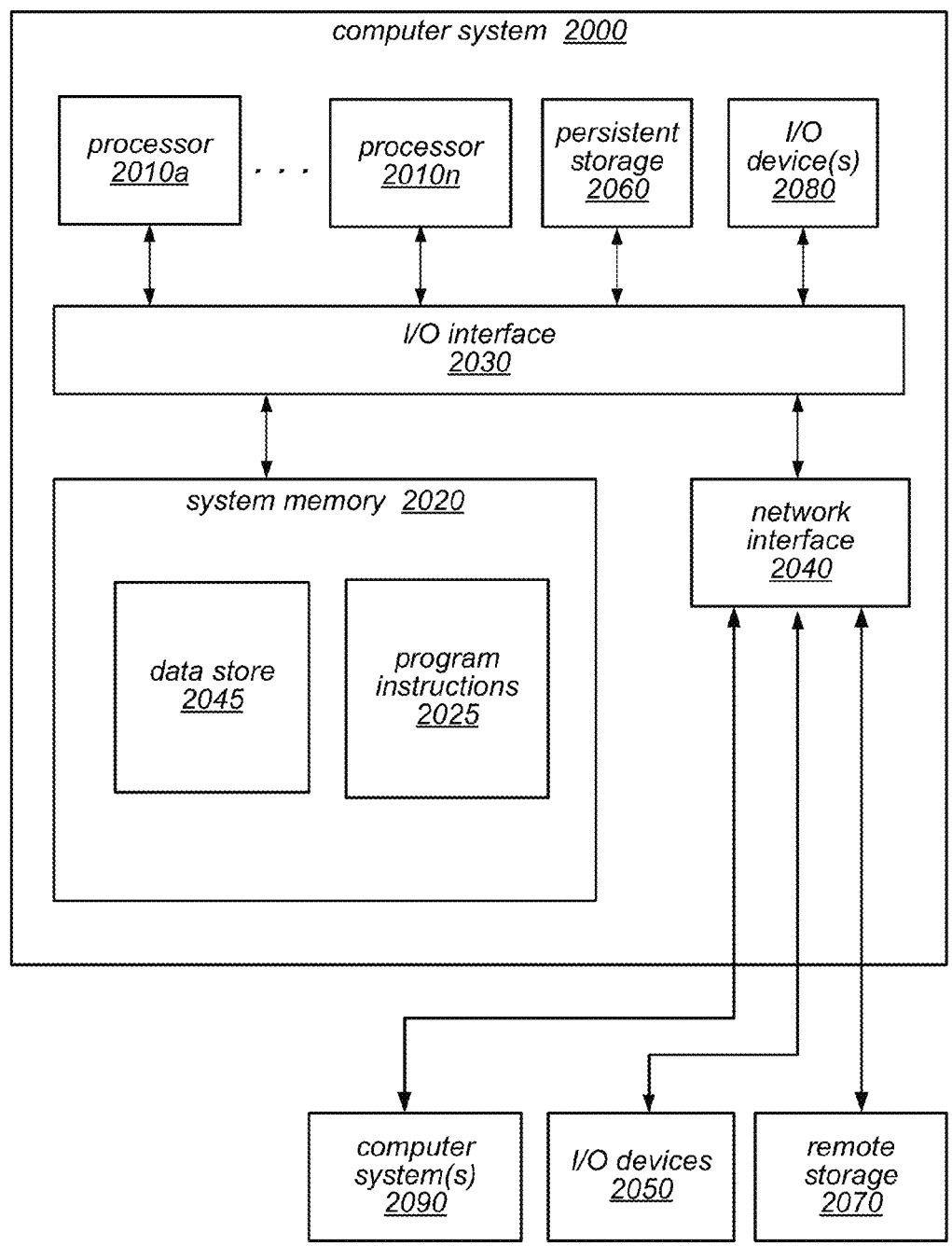
FIG. 12 is a block diagram illustrating an example computing system, according to some embodiments.

As illustrated in FIG. 4, a virtualization host 420, such as virtualization hosts 420a, 420b, through 420n, may implement and/or manage multiple compute instances 424, in some embodiments, and may be one or more computing devices, such as computing system 2000 described below with regard to FIG. 12. A virtualization host 320 may include a virtualization management module 422, such as virtualization management modules 422a, 422b through 422n, capable of instantiating and managing a number of different client-accessible virtual machines or compute instances 424. The virtualization management module 422 may include, for example, a hypervisor and an administrative instance of an operating system, which may be termed a "domain-zero" or "dom0" operating system in some implementations. The dom0 operating system may not be accessible by clients on whose behalf the compute instances 424 run, but may instead be responsible for various administrative or control-plane operations of the network provider, including handling the network traffic directed to or from the compute instances 424.

Figure 5:
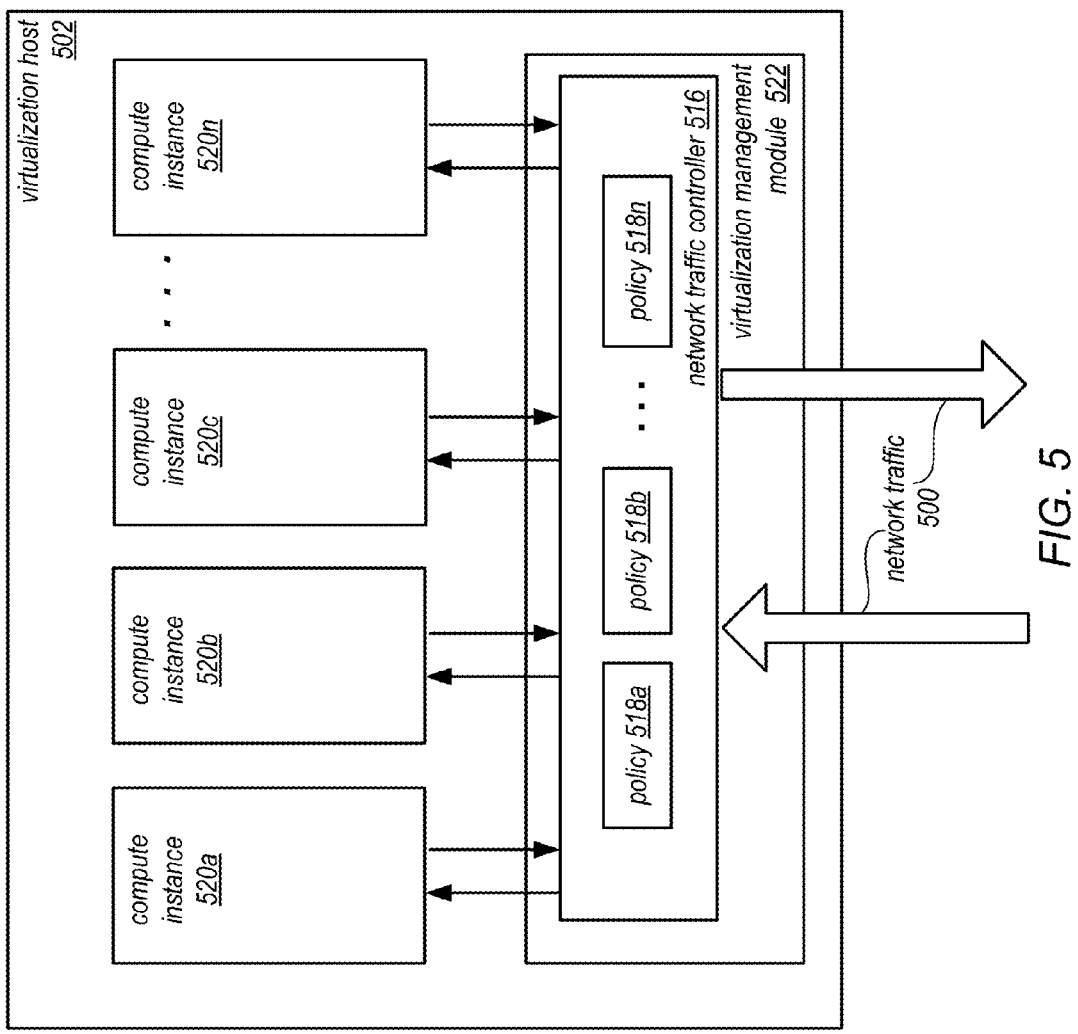
FIG. 5 is a block diagram illustrating network traffic processing by a network traffic controller for a virtualization host, according to some embodiments.

As illustrated in FIG. 4, virtualization management modules 422 may include a network traffic controllers 426, such as network traffic controller 426a, 426b through 426n. Network traffic controllers 426 may be configured to enforce various network traffic policies for compute instances 424, such as may be enforced based on the security group associations of compute instances 424. FIG. 5 is a block diagram illustrating network traffic processed by a network traffic controller for a virtualization host, according to some embodiments. As discussed above, virtualization host 502 may implement multiple compute instances 520a, 520b, 520c through 520n. Virtualization host 502 may also implement a virtualization management module 522 and network traffic controller 516. Network traffic 500 for compute instances 520 may be received at network traffic controller 516, either from another network entity as inbound network traffic, or a compute instance 520 as outbound network traffic. For particular network traffic received, network traffic control 516 may identify particular network traffic policies to apply, such as policies 518a, 518b, and/or 518n. For example, a routing table or other metadata may be used to identify a particular instance 520's network traffic policies. Network traffic policies may be applied to the network traffic, allowing, denying, restricting, limiting, etc., the network traffic according to the policy. Network entity handles included in the policy may be expanded to apply the network address information for the network entity referenced in the policy by the network entity handle according to the various techniques described below with regard to FIGS. 6-11. In some embodiments, network traffic controller 516 may request specified network address information from security group management service 440 and/or network entity registry 442. In some embodiments, network traffic controllers may maintain multiple versions of network address information received for a network entity handle, and may revert between versions according to an instruction from a security group management service 440 or registry 442, or based on self-determination.

Although illustrated as implemented by a virtualization host 420, in some embodiments, network traffic controllers 426 may be implemented separately from a virtualization host 420, such as on a different system or computing device. Network traffic controllers 426 may be implemented anywhere through which network traffic for a particular addressable element (e.g., instances 424) may be required to travel in order to reach its destination (i.e., in the traffic path). Thus the previous discussion and illustration of network traffic controllers in FIGS. 4 and 5 is not intended to be limiting.

Turning back to FIG. 4, provider network 400 may implement a security group management service 440, in various embodiments to manage security group updates or changes, such as by providing network address information specified in network entity entries in network entity registry 442 to network traffic controllers 426 and/or mapping service 430 according to the various techniques described below in FIGS. 6-11. Security group management service 440 may be implemented by one or more nodes, services, systems or devices, such as computing system 2000 described below with regard to FIG. 12. Security group management service may, in some embodiments, maintain mapping information between network traffic controllers 426, compute instances 424, security groups, network traffic policies, and particular network entity handles. In some embodiments, network traffic controllers 426 may register a listener or otherwise indicate a relationship with a particular network entity entry with security group manager service 440 in order to receive updates or notifications concerning the network entity entry.

In various embodiments, security group management service 440 may implement network entity registry 442. As discussed above with regard to FIGS. 1-3, network entity registry 442 may be configured to maintain network entity entries for network entities, including network address information, a network entity handle, as well as other information, such as version identifier, other versions of the network entity entry, and/or deployment or scheduling for the network entity entries. Network entity registry 442 may be implemented as database, index, structured data store, other scheme to maintain network entity entries. In some embodiments, associations may also be maintained network traffic policies including respective network entity handles, and/or network security group associations.

Internal network 410 may include the hardware (e.g., modems, routers, switches, load balancers, proxy servers, etc.) and software (e.g., protocol stacks, accounting software, firewall/security software, etc.) necessary to establish a networking links between different components of provider network 400, such as virtualization hosts 420, mapping service 430, and security group management service 440, as well as external networks 460 (e.g., the Internet). In some embodiments, provider network 400 may employ an Internet Protocol (IP) tunneling technology to provide an overlay network via which encapsulated packets may be passed through internal network 410 using tunnels. The IP tunneling technology may provide a mapping and encapsulating system for creating an overlay network on network 410 and may provide a separate namespace for the overlay layer and the internal network 110 layer. Packets in the overlay layer may be checked against a mapping directory (e.g., provided by mapping service 430) to determine what their tunnel target should be. The IP tunneling technology provides a virtual network topology; the interfaces that are presented to clients 450 may be attached to the overlay network so that when a client 450 provides an IP address that they want to send packets to, the IP address is run in virtual space by communicating with a mapping service (e.g., mapping service 130) that knows where the IP overlay addresses are. In some embodiments, mapping service 430 may provide network traffic control policies to the various network traffic controllers 426 for enforcement. In such embodiments, mapping service 430 may obtain or be provided with access to network address information for network entity handles that are included in network traffic policies, and provide the network address information to the network traffic controllers 426 for enforcement. In various embodiments, mapping service 430 may receive network address information for network traffic policies in order to expand network entity handles. The expanded network entity handle may then be provided by mapping service 430 to respective network traffic controllers that may enforce the network traffic policies including network entity handles.

Clients 450 may encompass any type of client configurable to submit requests to network provider 400. For example, a given client 450 may include a suitable version of a web browser, or may include a plug-in module or other type of code module configured to execute as an extension to or within an execution environment provided by a web browser. Alternatively, a client 450 may encompass an application such as a database application (or user interface thereof), a media application, an office application or any other application that may make use of compute instances 424 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 450 may be configured to generate network-based services requests according to a Representational State Transfer (REST)-style network-based services architecture, a document- or message-based network-based services architecture, or another suitable network-based services architecture. In some embodiments, a client 450 (e.g., a computational client) may be configured to provide access to a compute instance 424 in a manner that is transparent to applications implement on the client 424 utilizing computational resources provided by the compute instance 424.

Clients 450 may convey network-based services requests to provider network 400 via external network 460. In various embodiments, external network 460 may encompass any suitable combination of networking hardware and protocols necessary to establish network-based communications between clients 450 and provider network 400.

For example, a network 460 may generally encompass the various telecommunications networks and service providers that collectively implement the Internet. A network 460 may also include private networks such as local area networks (LANs) or wide area networks (WANs) as well as public or private wireless networks. For example, both a given client 450 and provider network 400 may be respectively provisioned within enterprises having their own internal networks. In such an embodiment, a network 460 may include the hardware (e.g., modems, routers, switches, load balancers, proxy servers, etc.) and software (e.g., protocol stacks, accounting software, firewall/security software, etc.) necessary to establish a networking link between given client 450 and the Internet as well as between the Internet and provider network 400. It is noted that in some embodiments, clients 450 may communicate with provider network 400 using a private network rather than the public Internet.

Figure 6:
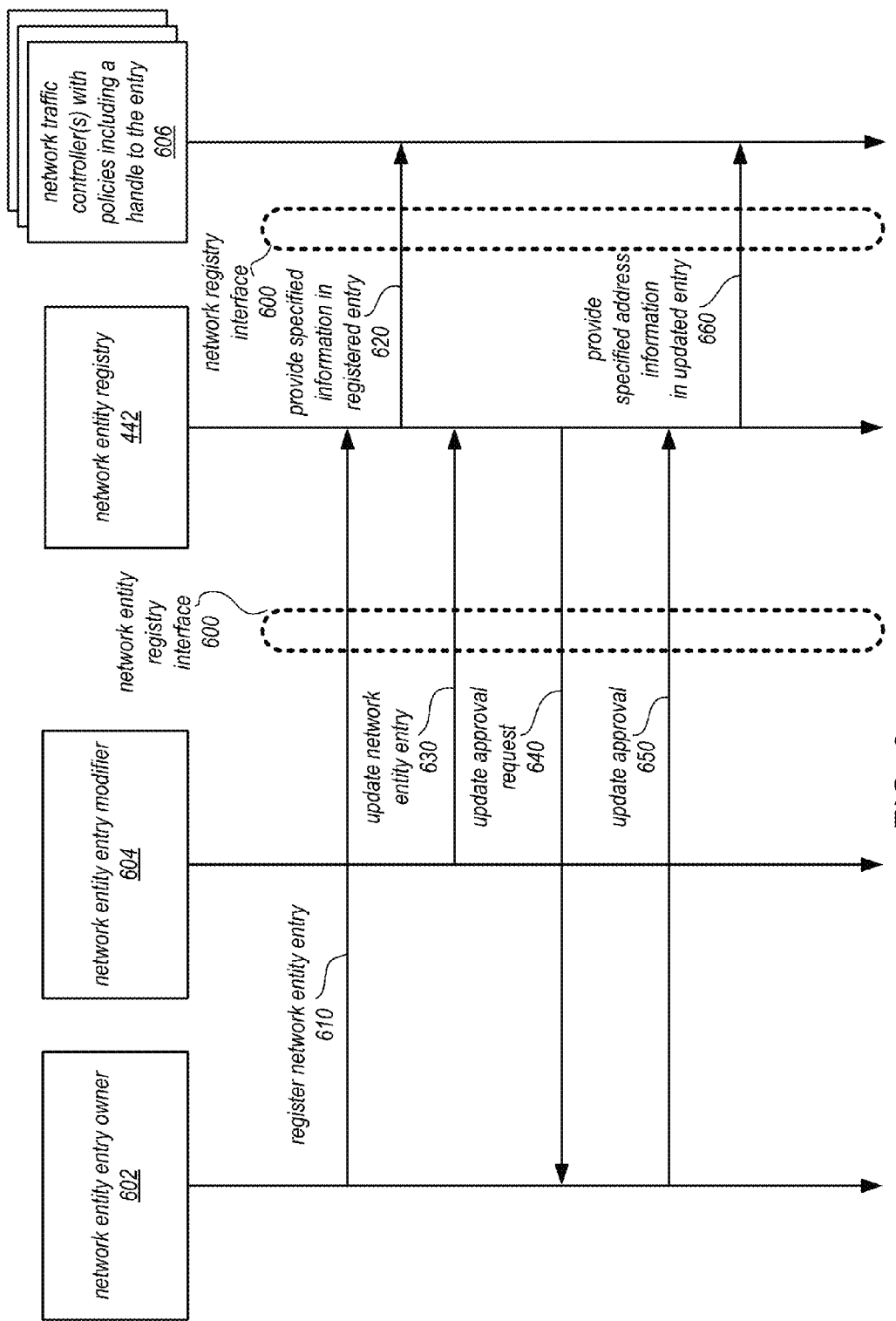
FIG. 6 is a block diagram illustrating interactions among network entity entry owners, network entity entry modifiers, and a network entity registry, according to some embodiments.

FIG. 6 is a block diagram illustrating interactions among network entity entry owners, network entity entry modifiers, and a network entity registry, according to some embodiments. Network entity registry 442 (or security group manager service 440) may implement an interface 600, such as a programmatic (e.g., API) or graphical interface, via which requests may be made to network entity registry 400. A network entity entry owner 602, which may be a client of provider network 400 that utilizes compute instances, or other compute resources of a provider network to implement various applications, services or functions, or a trusted network entity entry provider, may register 610 a network entity entry with network entity registry 442. Network entity registry 442 may accept the registration request (e.g., if valid identity or authentication credentials are included in the request. In some embodiments, improper or unauthorized creation or update requests may generate an error message sent back to the requestor. For example, in some embodiments, some network entity entries are static. A request to update a static network entity entry may return an error or denial of the request to update the static network entity entry. In some embodiments, a notification of the network entity entry (and/or the specified network address information for the entry) may be provided 620 to network traffic controllers 606 enforcing network traffic policies including a handle to the entry.

In some embodiments, a network entity entry modifier 604 (which may not be an owner of the network entity entry) may send an update request 630 to the network entity registry 442 to update a particular network entity entry. In some embodiments, approval for the update may be obtained by request update approval from the network entity entry owner 602, as indicated at 640. If approved, such as if approval 650 is received form network entity entry owner 602, then, a notification of the updated network entity entry (and/or the specified network address information for the updated entry) may be provided 660 to network traffic controllers 606 enforcing network traffic policies including a handle to the entry. In some embodiments, if approval is not obtained, the prior version of the entry may be reinstated at registry 442, or an indication to network traffic controllers that may have received network address information may be sent to revert to or obtain a different version of the network address information for the network entity entry. An update or change to the network entity entry 630 may, in some embodiments, be temporary (e.g., with a specified or default time period of effectiveness). Update approval 650 may, in some embodiments, be a reauthorization of the change either again as a temporary update or a permanent change.

Figure 7:
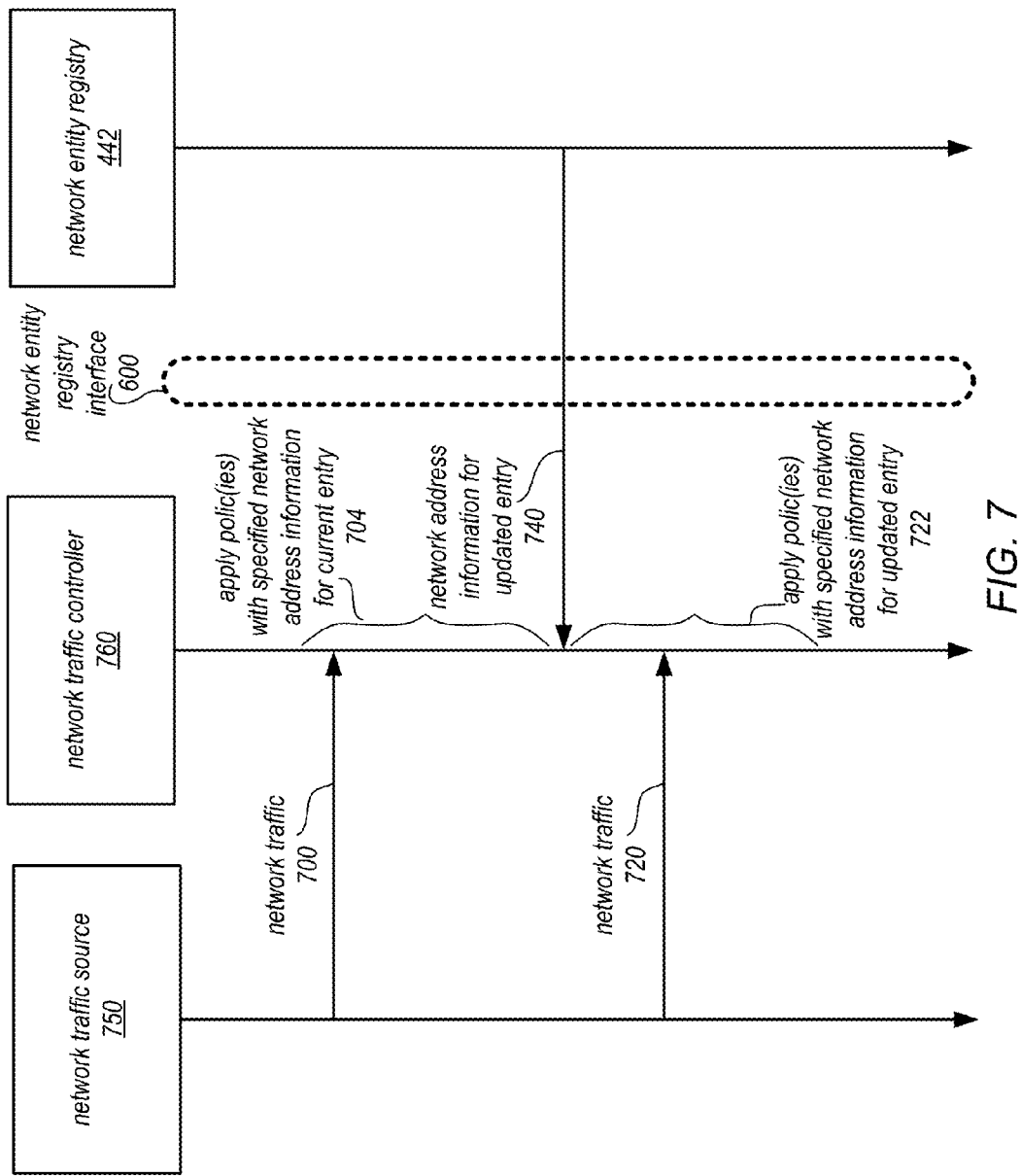
FIG. 7 is a block diagram illustrating interactions among a traffic source, network traffic controller, and a network entity registry, according to some embodiments.

FIG. 7 is a block diagram illustrating interactions among a traffic source, network traffic controller, and a network entity registry, according to some embodiments. Network traffic controller 760 may enforce network traffic policies (as described above with regard to FIG. 5) including network traffic policies that include network entity handles. Network traffic controller 760 may receive network address information pertaining to handles included in network traffic policies enforced by network traffic controller 760 via network entity registry interface 600 (described above with regard to FIG. 6) from network entity registry 442. Network traffic 700, received from a traffic source 750 (which may be traffic proceeding out from a compute instance to external destinations or traffic received inbound for a particular compute instance) may be evaluated. Policies including network entity handles may be applied 704 with specified network address information for the current entry of the network entity in network entity registry 442. If a change, update, or modification occurs to a network entity entry, network address information for the updated entry may be provided 740 from network entity registry 442 to network traffic controller 760. For example, a notification may be sent to controller 760 that a new version of the entry is available. Controller 760 may then request the specified network address information for the new version of the entry. Alternatively, in some embodiments, controller 760 may periodically (or aperiodically) poll the registry 442 for new versions of entries for handles included in network policies enforced at controller 760. In some embodiments, network address information for updated network entity entries may be pushed out to network traffic controllers 760 when updates are made. Once provided with network address information 740 associated with the updated network entity entry, network traffic 720 received at controller 760 may then be evaluated and network traffic policies applied with specified network address information for the updated entry, as indicated at 722.

Figure 8:
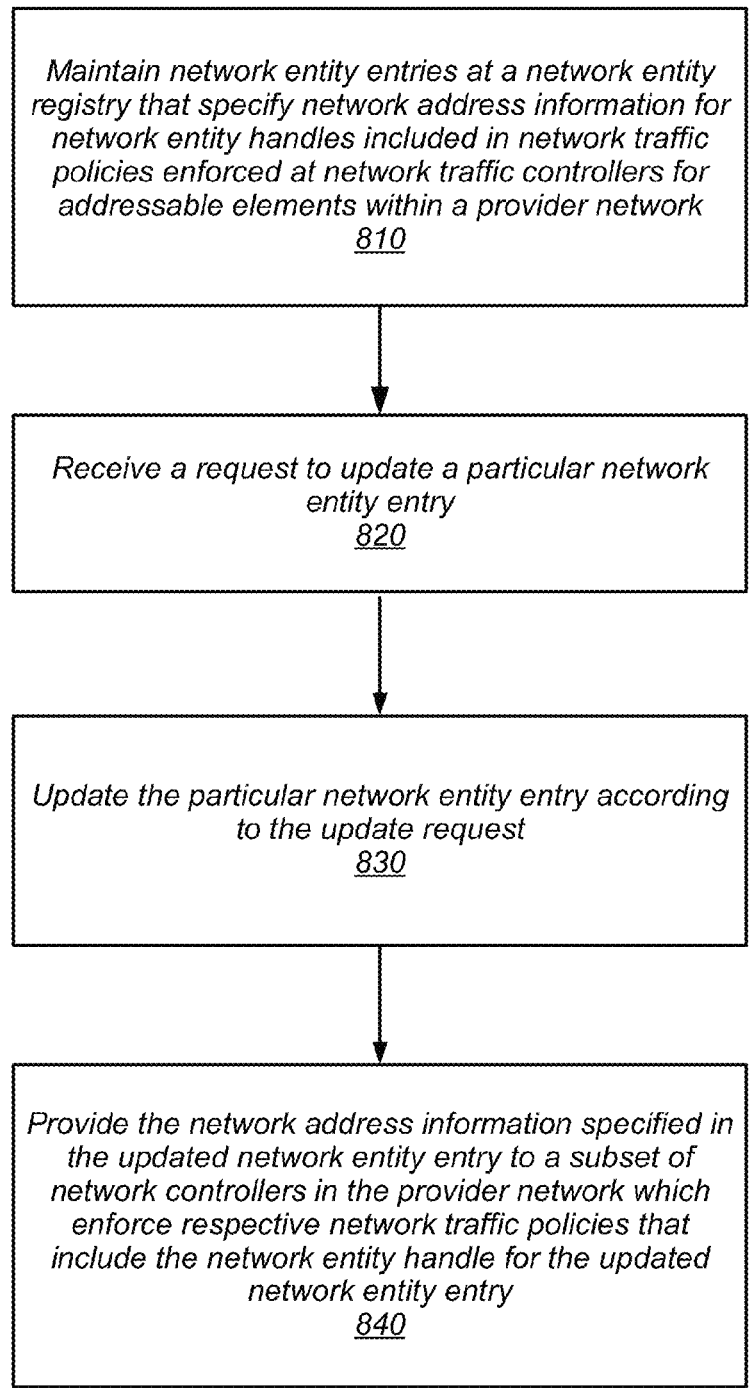
FIG. 8 is high-level flowchart illustrating various methods and techniques for implementing a network entity registry for network entity handles included in network traffic policies enforced for a provider network, according to some embodiments.

The examples of implementing a network entity registry for network entity handles included in network traffic policies enforced for a provider network discussed above with regard to FIGS. 4-7 have been given in regard to virtual computing resources offered by a provider network. Various other types or configurations of a provider network may implement these techniques. Other virtual computing resources, for example, for which security groups and network traffic policies are implemented, for instance, may implement a network entity registry. For example, virtual block storage volumes may enforce network traffic policies that are directed toward individual storage volumes. FIG. 8 is high-level flowchart illustrating various methods and techniques for implementing a network entity registry for network entity handles included in network traffic policies enforced for a provider network, according to some embodiments. These techniques may be implemented using various components of virtual computing resource provider as described above with regard to FIGS. 4-7 or other provider network components.

As indicated at 810, multiple network entity entries may be maintained at a network entity registry that each specify network address information for network entity handles included in network traffic policies enforced at network traffic controllers for addressable elements within a provider network. Addressable elements, as noted above, may be computing resources or other devices in a provider network which receive and sent network traffic for which one or more network traffic policies may be enforced by a network traffic controller, in some embodiments. The network entity registry may maintain entries (as noted above with regard to FIG. 3) that include network address information for a network entity, such as an IP address, range of IP addresses, masks, and various other forms of network address information to identify and/or communicate with a network entity. Network entity entries may also include a handle, such as handle reference or identifier, which may be included in network traffic policies to indicate the network entity entry which specifies network address information for the network traffic policy. In some embodiments, a version identifier may be maintained that identifies a particular version of the network entity entry (e.g., a version number or a timestamp). In some embodiments, multiple prior versions of entity entries may be maintained in addition to a current entity entry.

As indicated at 820, request to update a particular network entity entry may be received, in some embodiments. For example, the update request may wish to change the network address information in the entry (e.g., add new IP address, change range of IP addresses, add a different or swap in a new subnet), change deployment information for a network entity entry (e.g., to network traffic controllers) or any other change to the network entity entry. In some embodiments, various authentication checks or protocols may be performed. For example, the identity of the requestor may be validated, as well as the authorization to perform the update may be determined. In response to receiving the request, the particular network entity entry may be updated according to the request, as indicated at 830.

As indicated at 840, the network address information specified in the updated network entry may be provided to network traffic controllers in the provider network which enforce network traffic policies that include a network entity handle for the updated network entity entry. For example, multiple network traffic control policies may be implemented by multiple network traffic controllers. A subset of these network traffic controllers may enforce network traffic policies that include a handle to the particular network entity entry that is updated. Therefore, the specified network address information may be provided to the network traffic controllers of the subset of network traffic controllers, in various embodiments. Network traffic information may not be directly provided to network traffic controllers, in some embodiments. Instead, network traffic information may be provided to an intermediary system or device, which may ultimately provide the network traffic controllers with the network traffic information. For example, a mapping service or other system may register and receive network address information for network entity handles and update/provide/send/reconfigure network traffic controllers enforcing policies that include a network entity handle with the network address information for an updated entry.

A new network entity entry or an update to a network entity entry may not need to be performed, in at least some embodiments, in order to provide network address information to network traffic controllers. Thus, in some embodiments, elements 820 and 830, may not be performed, but instead, for a given network entity entry, the network address information may be provided to a subset of network traffic controllers which enforce network traffic policies including the entry. The various techniques for providing network information, such as the push or pull models discussed above and below, may also be applied. For example, network address information for different network entity entries may be periodically sent to network traffic controllers even if the network address information has not changed.

In some embodiments, network entity entry updates may be temporary. For example, the update request may specify duration for an update to a network entity entry. Upon expiration of the time period for the entry, the network entity entry may revert to a prior version of the entry, in some embodiments. Some network entity entries may be static or immutable, and thus may not be updated, in some embodiments (although they may be deleted and/or network traffic policies including the static network handle may be deleted).

Network address information may be provided to network traffic controllers in various ways. In some embodiments, the network traffic controllers enforcing network traffic policies that include the handle to the particular network entity entry that is updated may be identified. For example, network traffic controllers may register or request updates for specific network entity handles at the network entity registry. Based, on this registration information, network traffic controllers for a particular network entity entry may be identified. In some embodiments, network traffic entity controller may request (e.g., as part of a polling behavior) for new versions of network address information for network entity entries. Network address information may also be provided to network traffic controllers according to a deployment schedule. For example, network traffic controllers implemented for compute instances located in data center A may be provided with the network address information for the new version 2 hours before the network address information is provided to compute instances located in data center B. In some embodiments, a randomized deployment schedule may be implemented to simulate network outage and other problems by randomly block and unblocking network traffic by updating network entity entries.

Figure 9:
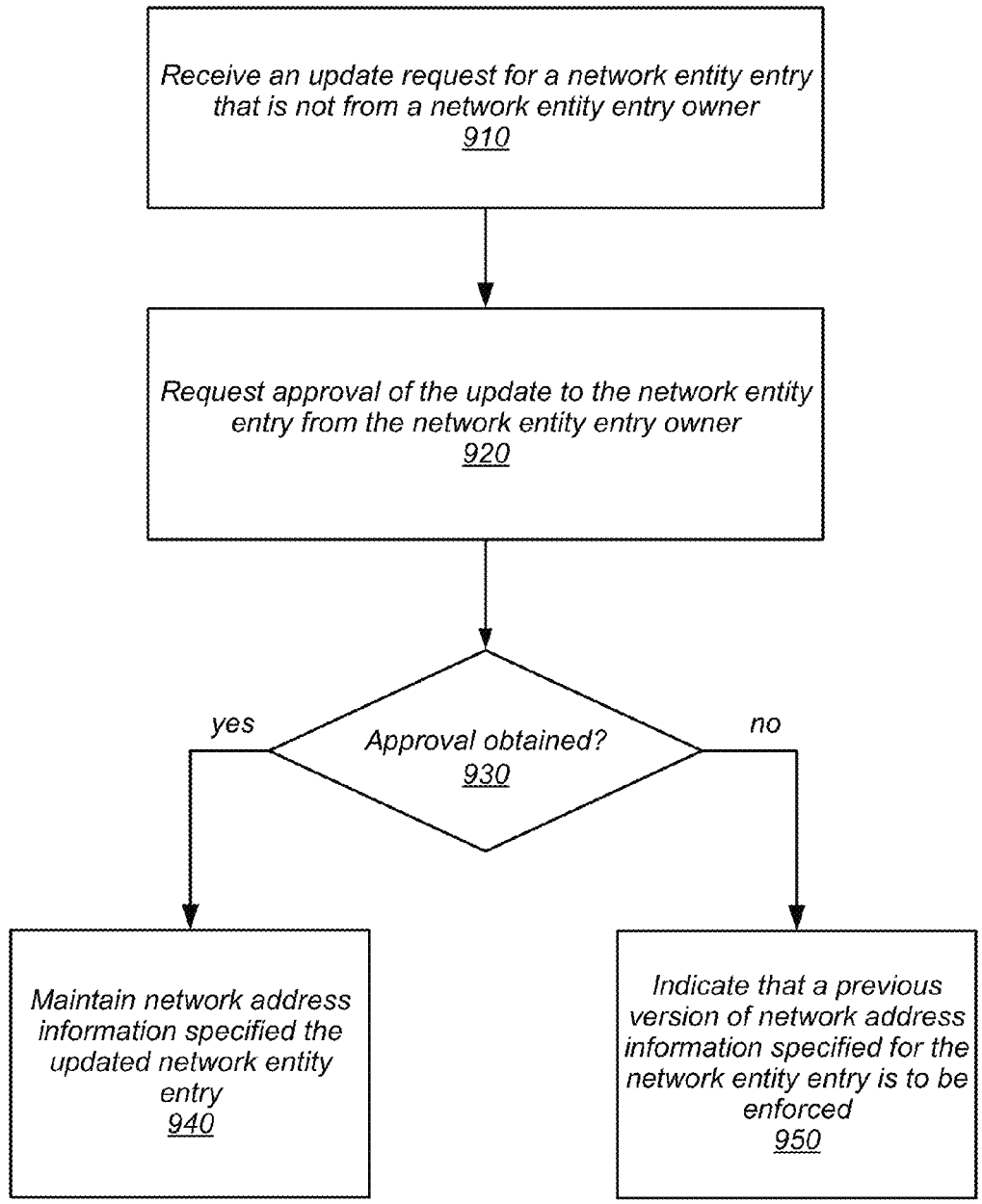
FIG. 9 is high-level flowchart illustrating various methods and techniques for obtaining approval for updates to network entity entries from a network entity entry owner, according to some embodiments.

Network entity entries may be created, registered, updated, or otherwise modified by many different entities, in some embodiments. A client, or other user, of a provider network, who owns, controls, configures, or administers computing resources, in some embodiments, may set up or associate security groups and/or network traffic policies for the security groups, as well as the network entity entries for which handles are included in the network traffic policies. For example, a developer or provider of a web service (e.g., a content distribution service), may utilize multiple compute instances, and associated different instances with one or more security groups with attendant network traffic policies for handling various types of network traffic directed toward the compute instances of the web service. The developer may also authorize a third-party (or other entity) to update or reconfigure network entity entries for the web service. If, for example, the content distribution service allows other services to connect to or upload media to the site (e.g., a social media service), then the content distribution service may authorize the trusted social media service to update a network entity entry which is referenced by a network entity handle included in a network traffic policy allowing traffic to the handle. Various authorization techniques may be used to delegate and/or authorize other entities that are not network entity entry owners (e.g., not the owner of the compute instance for which associated network flow control policies associated with the policy object). FIG. 9 is high-level flowchart illustrating various methods and techniques for obtaining approval for updates to network entity entries from a network entity entry owner, according to some embodiments.

As indicated at 910, an update request for a network entity entry may be received that is not from a network entity entry owner. In various embodiments, the update request may include various authentication credentials (e.g., identity token) and/or authorization credentials. The update request may be determined based, at least in part, on these or other credentials, not to be from a network entity entry owner, in some embodiments. The request may include a change to a network entity entry to be applied (e.g., an additionally allowed or different IP address). The update request may be formatted and received according to an interface, such as an API interface for registering, creating, and/or modifying network entity entry at a registry, such as registry 442 described above with regard to FIG. 4. In some embodiments, the update to the network entity entry may be performed and provided to network traffic controllers enforcing network traffic policies including a network entity handle for the network entity entry (such as described by the various techniques discussed above with regard to FIG. 8). The updated network entity entry may additionally be, in some embodiments, marked as temporary or unapproved. Unapproved changes to network entity entries may trigger additional approval mechanisms.

For example, as indicated at 920, approval of the update to the network entity entry may be requested from the network entity entry owner, in some embodiments. As noted above, metadata describing the network entity entry may include the identity of a network entity entry owner, a preferred contact method, pre-approved or authorized updates to the policy object, or other information useful for implementing or updating a network entity entry. Approval may be requested by sending a message via a security group management service interface to the policy object owner. For example, as a client of a virtual computing resource provider, the network entity entry owner may have access to a graphical user interface, such as a control panel, for which indications, alerts, or other ways of notifying a network entity entry owner of an approval request may be communicated. In some embodiments, a preferred notification or contact method may be previously provided to a security group management service which may indicate that electronic mail, text messages, or telephone calls are indicated to be directed toward specific accounts or telephone numbers. Included in the approval request may be information describing the change, as well as the identity of the entity modifying the network entity entry. Approval may be provided using the same or different communication method via which the approval request was made. In some embodiments, the approval request may include modifications to the change itself, or changes to the implementation, scheduling, or enforcement of the network entity entry.

If approval is obtained, as indicated by the positive exit from element 930, then the network address information for the updated network entity entry may be maintained, as indicated at 940, in some embodiments. For example, the updated network entity entry may be marked as approved or removed form a list of unapproved changes, etc., in order to make the network entity entry change permanent, in some embodiments. If approval is not obtained (e.g., within a certain period of time, or a negative or not-approved response is received), as indicated by the negative exit from element 930, an indication may be provided (e.g., to network traffic controllers) that a previous version of network address information specified in the network entity entry is to be enforced, as indicated at 950.

Figure 10:
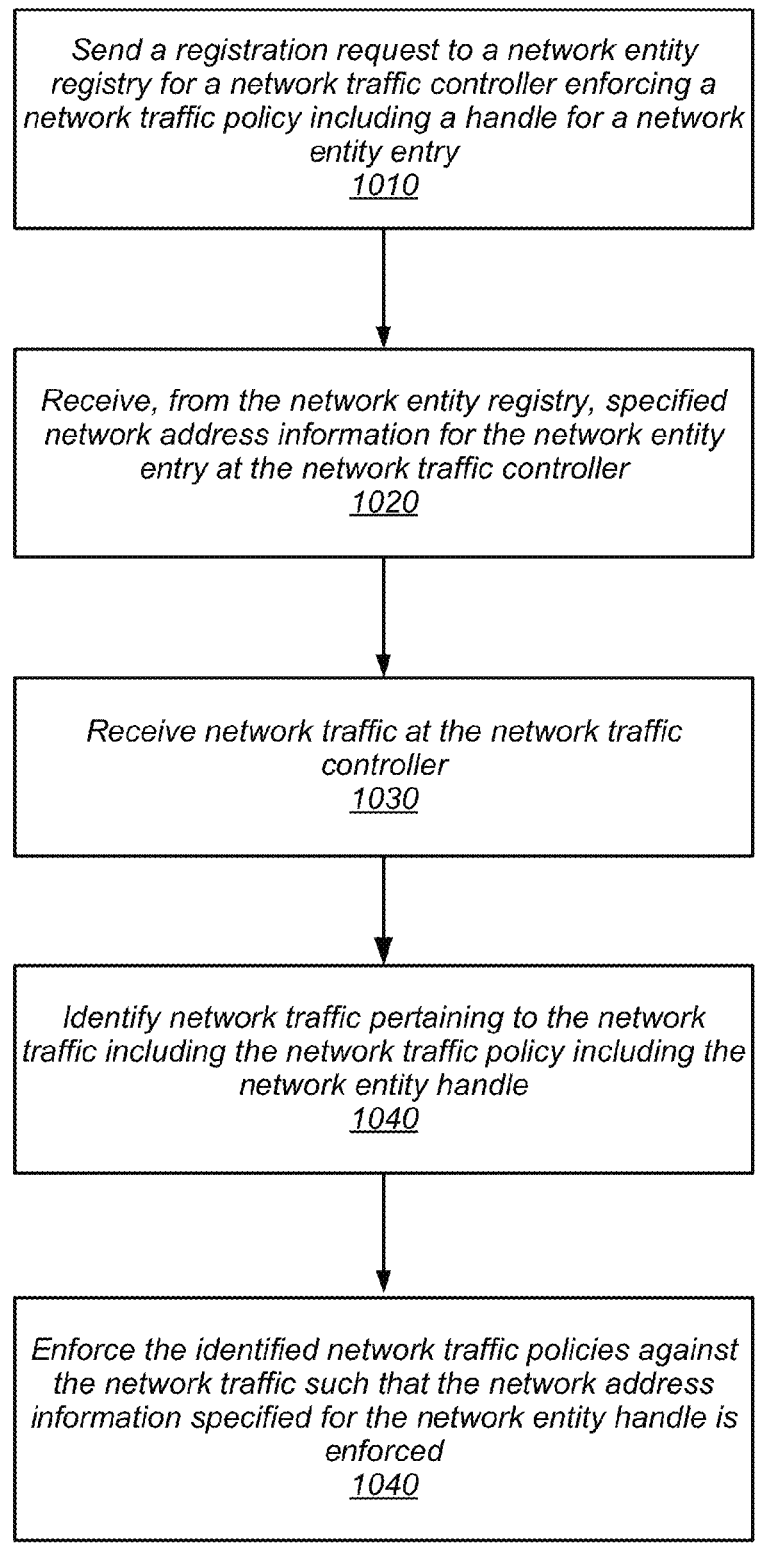
FIG. 10 is a high-level flowchart illustrating various methods and techniques for registering a network traffic controller to receive network address information for a network entity handle to a network entity entry in a network entity registry, according to some embodiments.

FIG. 10 is a high-level flowchart illustrating various methods and techniques for registering a network traffic controller to receive network address information for a network entity handle to a network entity entry in a network entity registry, according to some embodiments. As indicated at 1010, a registration request may be sent to a network entity registry for a network traffic controller enforcing a network traffic policy including a handle for a network entity entry. For example, the registration request may specify a notification or update mechanism for receiving updates to the network entity entry, such as by including a request to send specified network address information for the updated network entity entry to the network traffic controller when the update is performed (or merely to notify the network traffic controller that the update is performed). As indicated, at 1020, in some embodiments, the specified network address information may be received at the network traffic controller from the network entity registry. This specified information may be locally stored, in some embodiments (possibly along with prior versions of network address information for the network entity handle for the network entity entry). As indicated at 1030, network traffic may be received at the traffic controller and a network traffic policy including the network entity handle for the network entity entry may be identified. The identified network traffic policy may be enforced such that the specified network address information received for the network entity handle may be used to enforce the network traffic policy, as indicated at 1040 (e.g., block or allow "Bob_network" which the network address information identifies as "121.133.130.01").

Figure 11:
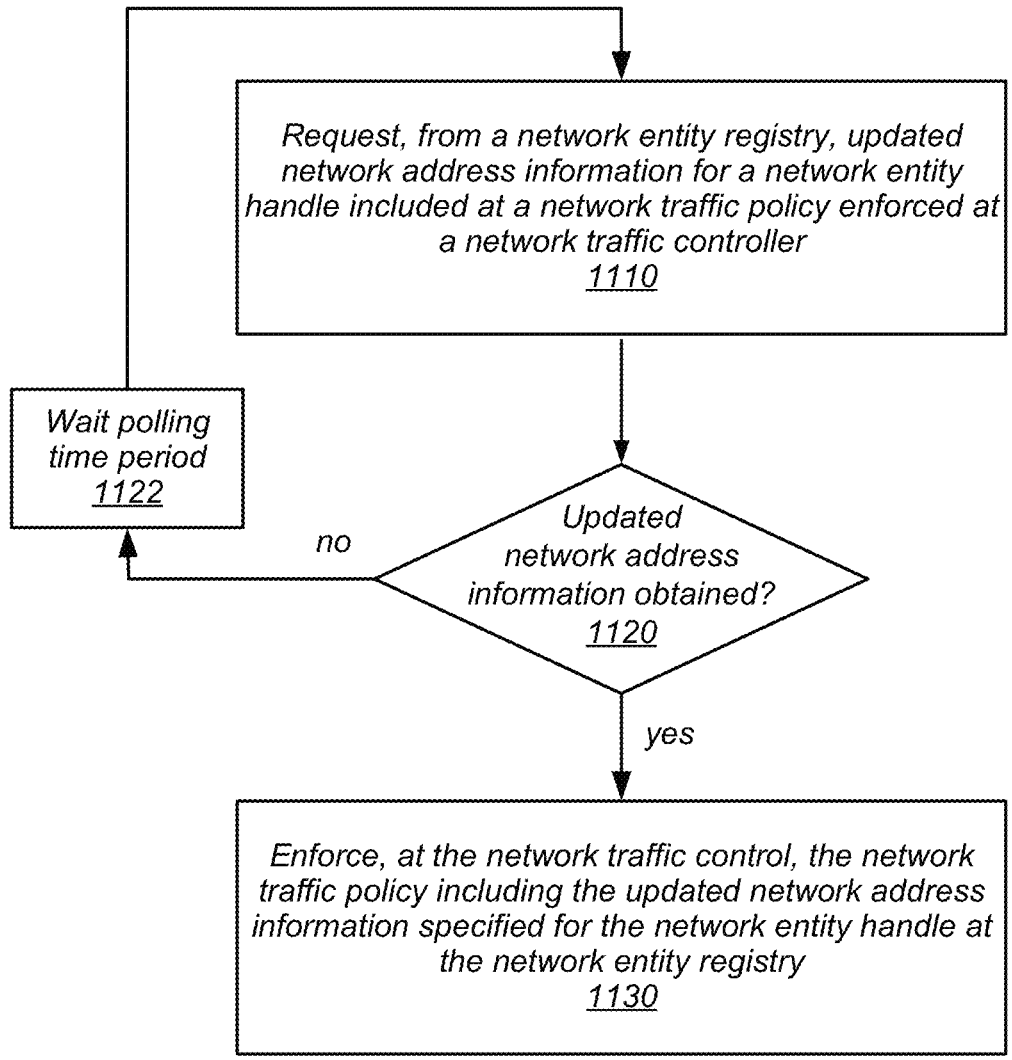
FIG. 11 is a high-level flowchart illustrating various methods and techniques for obtaining specified network address information for updated network entity entries, according to some embodiments.

As noted above, in some embodiments, network traffic controllers may request network address information for an updated network entity entry. FIG. 11 is a high-level flowchart illustrating various methods and techniques for obtaining specified network address information for updated network entity entries, according to some embodiments. As indicated at 1110, a request may be sent to a network entity registry for updated network address information for a network entity handle included in a network traffic policy enforced at the network traffic controller, in some embodiments. For example, the request may include a version number for the network entity entry. If a greater version number is available at the network entity registry, then the updated network address information may be provided. If the updated network address information is provided, as indicated by the positive exit form 1120, then the specified network address information may be used to enforce network traffic policies including the network entity handle for the network entity entry, as indicated at 1130. If, however, no updates are received, or no response is received from the network entity registry, a polling period may be allowed to elapse, as illustrated at 1122, prior to sending another request for updated network address information, as indicated at 1110.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Embodiments of security group management for dynamically updating security group policies for virtual computing resources as described herein may be executed on one or more computer systems, which may interact with various other devices. FIG. 12 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the data warehouse system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a virtual computing resource provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of compute nodes implementing a provider network, wherein the provider network implements a plurality of network traffic controllers, wherein each of the plurality of network traffic controllers enforce respective network traffic policies for one or more addressable elements within the provider network;
   a network entity registry, stored at one of the plurality of compute nodes of the provider network and configured to:
      maintain a plurality of network entity entries each specifying network address information for network entity handles, wherein the network entity handles are included in a respective one or more network traffic policies of the plurality of network traffic policies enforced at the plurality of network traffic controllers, and wherein the network entity handles comprise names or identifiers corresponding to respective ones of the plurality of network entity entries;

receive a request to update network address information for a respective network entity handle of a particular one of the plurality of network entity entries;

in response to receiving the request:

update the network address information for the respective network entity handle of the particular network entity entry according to the update request, wherein a subset of the plurality of network traffic controllers enforce network traffic policies that include the network entity handle for the network address information specified in the particular network entity entry; and provide the network address information specified in the updated network entity entry to network traffic controllers of the subset of network traffic controllers enforcing the respective one or more network traffic policies including the network entity handle in order to enforce the respective one or more network traffic policies according to the updated network address information specified in the particular network entity entry.

2. The system of claim 1, wherein to provide the network address information specified in the updated network entity entry to network traffic controllers of the subset of network traffic controllers enforcing the respective one or more network traffic policies including the network entity handle, the network entity registry is configured to:

receive a request from each of the network traffic controllers of the subset of network traffic controllers enforcing the respective one or more network traffic policies including the network entity handle; and in response to each request from the network traffic controllers of the subset of network traffic controllers, send the network address information of the updated network entity entry to the requesting network traffic controller.

3. The system of claim 1, wherein to provide the network address information specified in the updated network entity entry to network traffic controllers of the subset of network traffic controllers enforcing the respective one or more network traffic policies including the network entity handle, the network entity registry is configured to:

identify each of the network traffic controllers of the subset of network traffic controllers enforcing the respective one or more network traffic policies including the network entity handle; and send the network address information of the updated network entity entry to the identified network traffic controllers of the subset of network traffic controllers.

4. The system of claim 1, wherein the provider network is a virtual computing resource provider, wherein the addressable elements within the provider network are compute instances, wherein the network traffic controllers are each implemented on different virtualization hosts that also implement the one or more compute instances for which the network traffic controller enforces respective network traffic policies, wherein each of the respective network traffic policies are enforced for members of a particular security group of a plurality of security groups, and wherein the one or more compute instances are members of one or more security groups of the plurality of security groups.

5. A method, comprising:

performing, by one or more computing devices:

maintaining, at a network entity registry, a plurality of network entity entries each specifying network address information for network entity handles, wherein the network entity handles are included in a respective one or more network traffic policies enforced at a plurality of network traffic controllers, wherein each of the plurality of network traffic controllers enforce respective network traffic policies for one or more addressable elements within a provider network, and wherein the network entity handles comprise names or identifiers corresponding to respective ones of the plurality of network entity entries;

for a given network entity entry, providing the network address information specified in the given network entity entry to network traffic controllers of a subset of network traffic controllers enforcing network traffic policies including the network entity handle in order to enforce the network traffic policies according to the network address information specified in the given network entity entry.

6. The method of claim 5, wherein said providing the network address information specified in the given network entity entry to the network traffic controllers of the subset of network traffic controllers, comprises:

receiving a request from each of the network traffic controllers of the subset of network traffic controllers enforcing the respective one or more network traffic policies including the network entity handle; and in response to each request from the network traffic controllers of the subset of network traffic controllers, sending the network address information of the given network entity entry to the requesting network traffic controller.

7. The method of claim 5, wherein said providing the network address information specified in the given network entity entry to the network traffic controllers of the subset of network traffic controllers, comprises:

identifying each of the network traffic controllers of the subset of network traffic controllers enforcing the respective one or more network traffic policies including the network entity handle; and sending the network address information of the given network entity entry to the identified network traffic controllers of the subset of network traffic controllers.

8. The method of claim 5, wherein said providing the network address information specified in the given network entity entry to the network traffic controllers of the subset of network traffic controllers is performed according to a deployment schedule for an updated network entity entry such that the network traffic policies including the network entity handle are enforced for at least one addressable element of the one or more addressable elements within the provider network at a different time than another addressable element of the one or more addressable elements within the provider network.

9. The method of claim 5, further comprising:

receiving a request to update the given network entity entry;

in response to receiving the request:

updating the given network entity entry according to the update request; and performing said providing the network address information specified in the given network entity entry to the network traffic controllers of the subset of network traffic controllers.

10. The method of claim 9, wherein the request to update the given network entity entry is not received from a network entity entry owner of the given network entity entry, and wherein the method further comprises:

in response to receiving the request:
  requesting approval of the update to the given network entity entry from the network entity entry owner; and
  in response to obtaining approval for the update to the given network entity entry from the network entity entry owner, performing said updating the given network entity entry, and said providing the network address information specified in the given network entity entry.

11. The method of claim 9, wherein the request to update the given network entity entry is not received from a network entity entry owner of the given network entity entry, and wherein the method further comprises:
  in response to receiving the request:
    requesting approval of the update to the given network entity entry from the network entity entry; and
    in response to failing to obtain approval for the update to the given network entity entry from the network entity entry owner, indicating to the network traffic controllers of the subset of network traffic controllers enforcing the network traffic policies including the network entity handle that previous network address information for the network entity handle is to be enforced.

12. The method of claim 5, further comprising:
  receiving a request to update another network entity entry of the plurality of network entity entries, wherein the other entity network entity entry is maintained as a static network entity entry; and
  in response to receiving the update request for the static network entity entry, denying the update request.

13. The method of claim 5, wherein the provider network is a virtual computing resource provider, wherein the addressable elements within the provider network are compute instances, wherein the network traffic controllers are each implemented on different virtualization hosts that also implement the one or more compute instances for which the network traffic controller enforces respective network traffic policies, wherein each of the respective network traffic policies are enforced for members of a particular security group of a plurality of security groups, and wherein the one or more compute instances are members of one or more security groups of the plurality of security groups.

14. A non-transitory, computer-readable storage medium, storing program instructions that when executed by one or more computing devices cause the one or more computing devices to implement:
  maintaining, at a network entity registry, a plurality of network entity entries each specifying network address information for network entity handles, wherein the network entity handles are included in a respective one or more network traffic policies enforced at a plurality of network traffic controllers, and wherein each of the plurality of network traffic controllers enforce respective network traffic policies for one or more addressable elements within a provider network, and wherein the network entity handles comprise names or identifiers corresponding to respective ones of the plurality of network entity entries;
  receiving a request to update a particular one of the plurality of network entity entries;
  in response to receiving the request:
    updating network address information for a respective network entity handle of the particular network entity entry according to the update request, wherein a subset of the plurality of network traffic controllers enforce network traffic policies that include the network entity handle for the network address information specified in the particular network entity entry; and
    providing the network address information specified in the updated network entity entry to network traffic controllers of the subset of network traffic controllers enforcing the respective one or more network traffic policies including the network entity handle in order to enforce the respective one or more network traffic policies according to the updated network address information specified in the particular network entity entry.

15. The non-transitory, computer-readable storage medium of claim 14, wherein, in said providing the network address information specified in the updated network entity entry to the network traffic controllers of the subset of network traffic controllers enforcing the respective one or more network traffic policies including the network entity handle, the program instructions further cause the one or more computing devices to implement:
  receiving a request from each of the network traffic controllers of the subset of network traffic controllers enforcing the respective one or more network traffic policies including the network entity handle; and
  in response to each request from the network traffic controllers of the subset of network traffic controllers, sending the network address information of the updated network entity entry to the requesting network traffic controller.

16. The non-transitory, computer-readable storage medium of claim 14, wherein, in said providing the network address information specified in the updated network entity entry to the network traffic controllers of the subset of network traffic controllers enforcing the respective one or more network traffic policies including the network entity handle, the program instructions further cause the one or more computing devices to implement:
  identifying each of the network traffic controllers of the subset of network traffic controllers enforcing the respective one or more network traffic policies including the network entity handle; and
  sending the network address information of the updated network entity entry to the identified network traffic controllers of the subset of network traffic controllers.

17. The non-transitory, computer-readable storage medium of claim 16, wherein the program instructions further cause the one or more computing devices to implement:
  prior to performing said identifying the network traffic controllers, receiving registration requests from the network traffic controllers of the subset of network traffic controllers enforcing the respective one or more network traffic policies including the network entity handle;
  wherein said identifying the network traffic controllers is based, at least in part, on the registration requests.

18. The non-transitory, computer-readable storage medium of claim 14, wherein the update version of the particular network entity entry is a temporary version of the particular network entity entry, and wherein the program instructions further cause the one or more computing devices to implement:
  upon expiration of a time period for the temporary version of the particular network entity entry, indicating to the one or more network traffic controls associated with the respective one or more network traffic policies described by the updated version of the network entity entry that a previous version of the network entity entry is to be enforced.

19. The non-transitory, computer-readable storage medium of claim 14, wherein the request to update the particular network entity entry is not received from a network entity entry owner of the particular network entity entry, and wherein the program instructions further cause the one or more computing devices to implement:
 in response to receiving the request:
  requesting approval of the update to the particular network entity entry from the network entity entry owner; and
  in response to obtaining approval for the update to the particular network entity entry from the network entity entry owner, performing said creating the updated version of the particular network entity entry, and said providing the updated version of the network entity entry.

20. The non-transitory, computer-readable storage medium of claim 14, wherein the provider network is a virtual computing resource provider, wherein the addressable elements within the provider network are compute instances, wherein the network traffic controllers are each implemented on different virtualization hosts that also implement the one or more compute instances for which the network traffic controller enforces respective network traffic policies, wherein each of the respective network traffic policies are enforced for members of a particular security group of a plurality of security groups, and wherein the one or more compute instances are members of one or more security groups of the plurality of security groups.

* * * * *